United States Patent [19]
Mills et al.

[11] 3,967,232
[45] June 29, 1976

[54] METHODS OF DETECTING UNDERWATER OBJECTS AND APPARATUS THEREFOR

[75] Inventors: Noel Mills; Geoffrey Peter Warley, both of Yeovil, England

[73] Assignee: Westland Aircraft Limited, Yeovil, England

[22] Filed: June 28, 1973

[21] Appl. No.: 373,480

[30] Foreign Application Priority Data
June 29, 1972 United Kingdom............... 30584/72

[52] U.S. Cl...................................... 340/2; 340/3 T; 340/6 R
[51] Int. Cl.².......................................... G08B 13/00
[58] Field of Search................ 340/2, 3 R, 3 T, 5 R, 340/6 R

[56] References Cited
UNITED STATES PATENTS

| | | | |
|---|---|---|---|
| 2,422,337 | 6/1947 | Chilowsky | 340/2 |
| 3,159,806 | 12/1964 | Piasecki | 340/3 T |
| 3,786,403 | 1/1974 | Will et al. | 340/2 |

*Primary Examiner*—Richard A. Farley
*Attorney, Agent, or Firm*—Larson, Taylor & Hinds

[57] ABSTRACT

The invention discloses a method of detecting underwater objects and an apparatus therefor, and is particularly concerned with such methods and apparatus for use in conjunction with a helicopter.

A buoyant structure houses a sonar body in a stowed position, and is suspended on a cable from a releasable attachment on a helicopter. Means are provided for lowering and raising the buoyant structure relative to the helicopter and for lowering and raising the sonar body relative to the buoyant structure.

The cable is provided with flotation and sea anchor means to deploy the cable across the water surface when it is released from the helicopter during one stage of operation, means being provided on the helicopter to recover the cable from the water to facilitate recovery of the apparatus.

7 Claims, 7 Drawing Figures

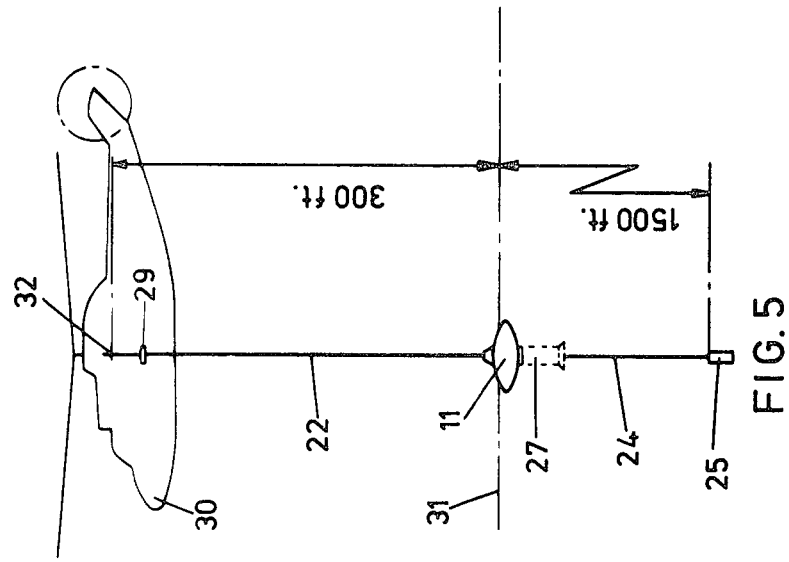
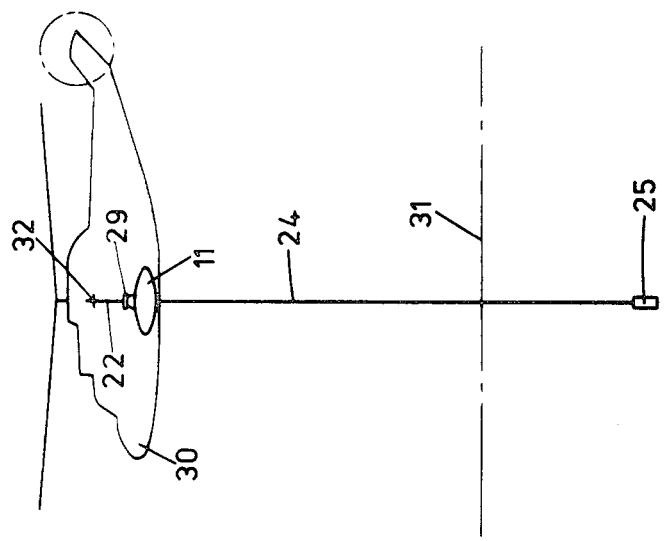

Shaped body members 28 are secured on the upper surface of the casing of compartments 13 and 14 to facilitate location of the pod 11 with mounting points on the helicopter (not shown), which may be in the form of existing weapon carriers. In a preferred arrangement the pod 11 is located, when stowed, in a trough under the floor of the helicopter fuselage; however, it is to be understood that other suitable mounting points could be used, for instance, on weapon carriers located at the sides of the fuselage.

Figure 1:
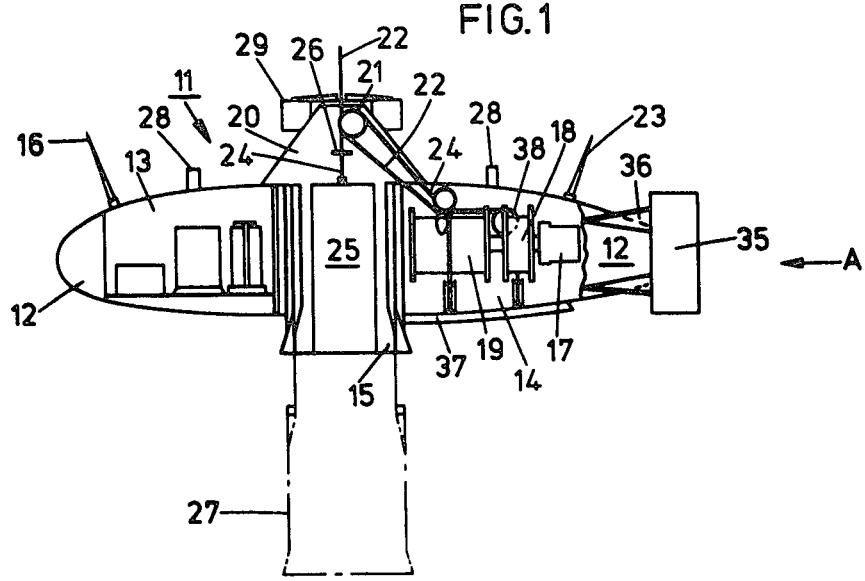

The cable 22 is threaded through a flotation collar and sea anchor assembly 29 which is secured on the cable 22 at a certain distance from its free end, for a purpose to be hereinafter explained. In the embodiment shown, the distance is such that when the pod 11 is in its stowed position on the helicopter, the collar 29 rests on the cover 20, as shown in FIG. 1. Alternatively, separate securing means (not shown) could be provided in the helicopter fuselage separate from the pod 11 to secure the assembly 29 at a suitable distance from the free end of the cable 22.

The method of operation of the apparatus according to the present invention will now be described with reference to FIGS. 4, 5, 6 and 7. In the drawings a helicopter 30 is shown hovering above a water surface 31.

Referring now to FIG. 4, a buoyant structure in the form of a pod 11 as hereinbefore described is shown secured to the helicopter fuselage by cable 22 releasably suspended from a strong point 32 within the fuselage. The pod 11 is located by the shaped body members 28 engaging with suitable mountings. Cable 24 has been released by operation of the motor 17 driving the cable drum 19 to lower the sonar body 25 into the water, thus facilitating operations at depths similar to existing apparatus (up to 450 feet). In this configuration the helicopter power supply is used and is connected to the pod 11 through the connection afforded by the cable 22, which also facilitates the transmission of control signals to the motor 17 and the sleeve assembly 27. Station keeping is effected as at present through signals from the cable angle sensors 26 in the pod 11 being transmitted to the helicopter automatic flight control system.

When it is required to operate the sonar body 25 at greater depths (say 1,500 feet), cable drum 19 is disengaged from the motor 17 which is then engaged to rotate cable drum 18 to let out cable 22 and lower the pod 11 from the attachment 32 onto the water surface 31, as shown in FIG. 5. Cable drum 19 is then engaged to let out cable 24 and lower the sonar body 25 to its operating depth. The cable 22 is still connected to the helicopter, at 32, thus allowing the continued use of the helicopter power supply. As shown in FIG. 5 the flotation collar 29 remains at its fixed distance from the end of the cable 22 secured to the helicopter at 32. During this stage of operation the cable angle sensors 26 in the pod 11 are not used, the helicopter 30 keeping station with the pod 11 by any suitable means, which may include doppler, radar, television, or even visually using lights. The telescopic sleeve 27 is lowered to stabilize the pod 11 in the water, roll stability being further enhanced by the fins 37. Rotational movement of the pod 11 about its vertical axis is prevented by the fin structure 35 and 36.

Once a positive contact has been made the pod 11 is released by disconnecting the cable 22 from the strong point 32, so that the cable drops into the water together with the flotation collar and sea anchor 29, which acts to deploy the cable 22 across the water surface 31 downwind of the pod 11 (FIG. 6), thus freeing the helicopter 30 to make an immediate attack. Contact is maintained between the helicopter 30 and the pod 11 through the data link radio powered from the battery in compartment 13. The sonar body is also powered by the self-contained battery to maintain a continual fix on the detected submarine, any evasive action being immediately transmitted to the helicopter 30 through the data link radio in compartment 13, so that the helicopter 30 is kept up to date regarding positional changes of the submarine during its attack.

Once an attack has been completed the helicopter is guided back to the pod 11 by signals emitting from the recovery beacon aerial 23. A small subsidiary winch and cable 33 is then used to lower a hook 34 into the water and the helicopter proceeds to trawl for the cable 22 until the hook 34 engages the flotation collar 29. The flotation collar 29 is winched into the helicopter 30 and the cable 22 secured to the strong point 32, as shown in FIG. 5, so that the helicopter power supply can now be reconnected to the pod 11.

The telescopic sleeve 27 is retracted into the pod 11 and the winch drum 18 is rotated to winch the pod 11 up to its stowed position on the helicopter 30, as shown in FIG. 4. Cable drum 19 is then engaged to raise the sonar body 25 to its stowed position in the aperture 15 (FIG. 1), into which it is guided by the sleeve assembly 27, and the helicopter is free to fly to another station or to return to base. Alternatively when moving to another station, the pod 11 can be towed by the helicopter, in the configuration shown in FIG. 5, thereby saving the time taken to winch the pod 11 up to the helicopter. Towing of the pod 11 is facilitated by the fin structure 35 and 36. If desired, the cable drums 18 and 19 can be operated simultaneously to significantly reduce the recovery time.

It will be apparent that, whenever it is required to operate the motor 17 or the sleeve assembly 27, the cable 22 is connected to the helicopter 30, thus facilitating the use of the helicopter electrical supply and the transmission of the necessary control signals from the helicopter 30.

The apparatus of the present invention has many advantages over existing equipment. The risk of losing contact during the period normally required to raise the sonar body and fly to the last known contact, lower the body again and finally drop torpedoes, is completely eliminated. One method of overcoming this risk has been to use two helicopters, one for making and maintaining contact and for guiding the second helicopter to the attack position. It will be apparent that the present invention provides an identical facility using a single helicopter.

By maintaining an operational sonar body on station, the submarine, having detected its presence from a specific direction, will be unaware that the helicopter is no longer the source of energy supply, and is, therefore, less likely to take evasive action. The deterrent effect of an operational sonar body, which causes a submarine to remain submerged and thereby prevents it making an attack, is greatly enhanced by our invention in that the sonar body is continuously operational.

A further important advantage of the present invention is derived from the fact that the self-contained buoyant structure is connected in the helicopter fuselage only by the cable 22 being secured to a single

METHODS OF DETECTING UNDERWATER OBJECTS AND APPARATUS THEREFOR

This invention relates to methods of detecting underwater objects and apparatus therefor, and more particularly to such methods and apparatus adapted to be operated in conjunction with a helicopter.

It is known to employ specially equipped helicopters for the underwater detection and subsequent destruction of submarines. The current method comprises a helicopter equipped with both a dunking sonar body and torpedoes and, whilst continuous improvements have been made in the detection equipment, the weapons and the helicopters, modern submarine performance requires detection apparatus which will operate satisfactorily at ever increasing depths.

The effect of operating sonar equipment at greater depth upon the performance of the overall system has to be considered. One problem, inherent in the present system and aggravated by the increased operating depths, is that of time. Despite improved winching speeds, operation at greater depths means longer times for both lowering and raising the sonar body, which, apart from reducing the number of dunks in each sortie, increases the risk of losing any detected target during the time required to raise the sonar body and move off to the attack position. A further problem associated with dunking at greater depths is that of the helicopter maintaining station in relation to the sonar body. The increased depth at which the sonar body is required to operate greatly diminishes the effectiveness of the cable angle sensors, since any drift and consequent tilt of the sonar body is less apparent and attracts a less significant reaction from the helicopter automatic flight control system.

According to the invention we provide a method of detecting underwater objects from a helicopter, the method including the following steps:

a. suspending a buoyant structure on a cable attached to the helicopter,
b. hovering above a water surface and lowering the buoyant structure on the cable to float on the water,
c. lowering a sonar body from a stowed position in the buoyant structure to its operating depth in the water,
d. when a contact is made, releasing the cable from its attachment to the helicopter and dropping the cable into the water,
e. maintaining operational contact between the sonar body and the free-flying helicopter,
f. recovering the cable from the water and reconnecting the cable to the attachment in the helicopter,
g. raising the buoyant structure to the helicopter,
h. raising the sonar body to its stowed position in the buoyant structure.

According to another aspect of the invention we provide underwater detection apparatus comprising in combination, a buoyant structure, a sonar body housed in a generally vertical aperture within the buoyant structure, first and second cable drums located in the buoyant structure and being operable by a motor and clutch means located in the structure, a cable wound on the first cable drum and routed upwardly for releasable attachment to a helicopter so that rotation of the first drum is effective to raise and lower the buoyant structure relative the helicopter, the cable being constructed and arranged to carry electrical power and control signals when attached to the helicopter, a cable wound on the second cable drum and routed downwardly to support the sonar body so that rotation of the second cable drum is effective to raise and lower the sonar body relative the buoyant structure, the cable being constructed and arranged to carry electrical power to operate the sonar body, an electrical power supply carried by the buoyant structure for operating the sonar body and a transmitting means when the cable from the first drum is detached from the helicopter, and flotation means on the cable from the first drum and located adjacent the end arranged for releasable attachment to the helicopter.

Figure 2:
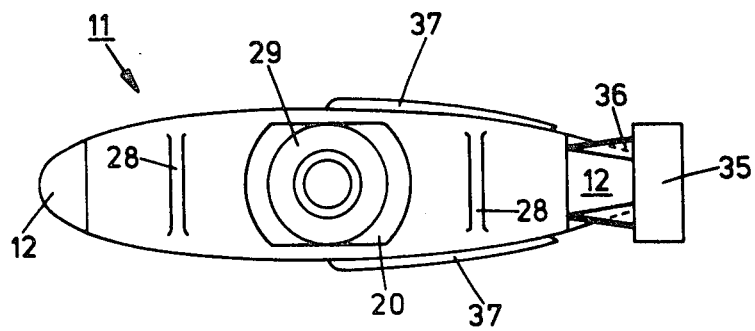
Figure 3:
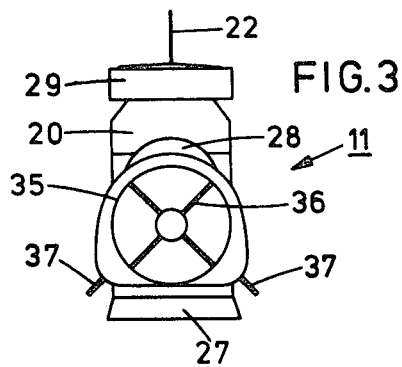
Figure 7:
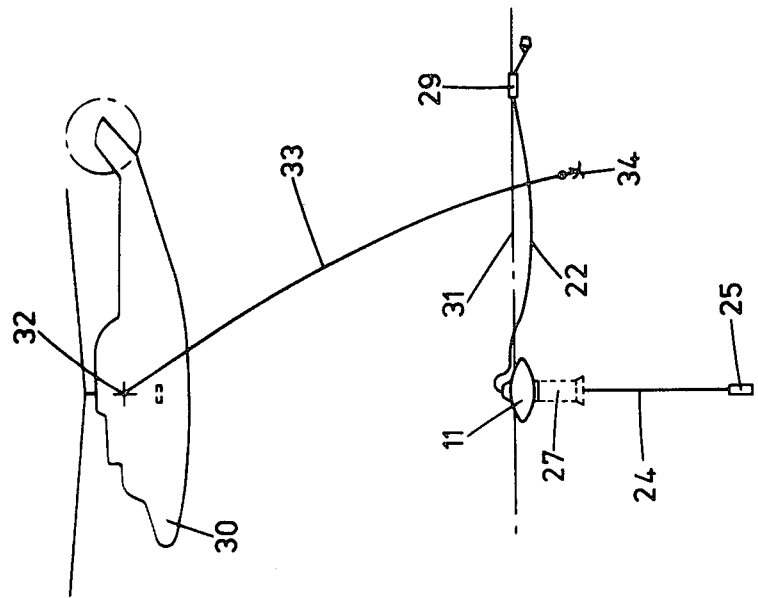
Figure 6:
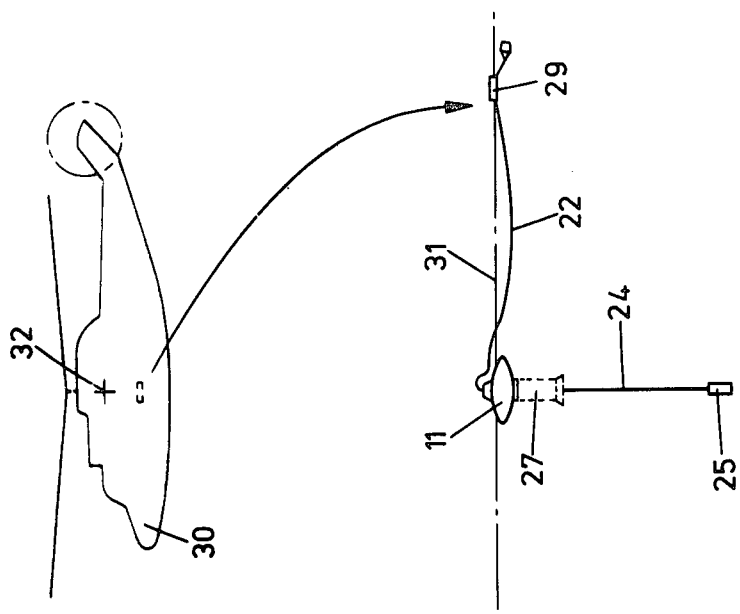

The invention will now be described by way of example only, and with reference to the accompanying drawings, in which:

FIG. 1 is a sectioned side view of underwater detection apparatus according to the invention, FIG. 2 is a plan view, FIG. 3 is an end view in the direction of arrow A, and FIGS. 4, 5, 6 and 7 are diagrammatic illustrations showing the method of operation of the underwater detection apparatus according to the present invention.

Referring now to FIG. 1, a buoyant structure in the form of an elongated streamlined hollow pod 11 is shown in a horizontal position in which it is adapted for mounting on a helicopter and in which it is arranged to float. The pod 11 tapers towards each end and, in cross-section, has a radiussed upper surface and a flat lower surface, as shown in FIG. 3. Each end of the pod 11 is completed by a hose section 12, and one end is fitted with a circular member 35 concentric about a longitudinal centerline and supported from the pod 11 by four equispaced radially extending fins 36. A vertically arranged aperture 15 is provided intermediate the ends of the pod 11, and sub-divides the pod 11 into two compartments 13 and 14 respectively. Two longitudinally arranged fins 37 extend radially from each extremity of the flat lower surface of compartment 14.

Compartment 13 houses a data link radio and battery, and a data link aerial 16 protrudes from the upper surface. A winch drive motor 17 is located in compartment 14, together with two cable drums 18 and 19 and associated pulleys 38. Clutch mechanisms (not shown) are provided so that the cable drums 18 and 19 can be driven either simultaneously or independently by the motor 17 and in either direction of rotation. A recovery beacon aerial 23 protrudes from the upper surface of compartment 14.

A generally truncated cone shaped cover section 20 is secured to the upper surface of the pod 11 around the aperture 15. The cover 20 supports a double pulley wheel 21 and has an open upper end so that cable 22 from drum 18 can pass around the pulley 21 for releasable attachment to the helicopter (not shown). Cable 24 from cable drum 19 passes over pulley 21 and supports a sonar body 25 centrally of the aperture 15. The cables 22 and 24 are capable of carrying electrical power supplies and control and operational signals between the helicopter and the pod 11 and sonar body 25. Cable angle sensing forks 26 are located within the cover 20 around the cable 24. A telescopic sleeve assembly 27 is located in the aperture 15, and is shown in full line in a stowed position and in broken line in a lowered position. Raising and lowering of the sleeve assembly 27 is accomplished electrically.

strong point 32. This of course means that a very large proportion, by both weight and volume of the equipment required for the sonar role, is removed from the confines of the fuselage, and ensures that the helicopter is capable of very speedy role changes. Also, in the event of an engine failure or a rescue emergency, the complete structure in the form of the pod 11 can be jettisoned to provide an appreciable weight saving.

It will also be apparent that, as the sonar body 25 is suspended from the pod 11 floating on the surface 31, the attitude of the sonar body 25 is not wholly dependent upon the position of the helicopter 30, which means that station keeping is much less critical than with existing apparatus.

Maintenance procedures are much simplified by the apparatus of the present invention, since all the mechanical parts of the system are contained within the releasable pod 11 which can, therefore, be serviced separately from the helicopter. Performance checks can be accomplished with the pod suspended from any structure such as a hangar roof. Also, a last minute failure before a sortie can be nullified by a complete change of pod in a very short time, thereby causing a minimum delay. Preferably, the pod 11 is of modular construction, permitting rapid replacement of defective components.

Although one embodiment only of the invention has been described and illustrated, it is to be understood that modifications can be made without departing from the scope of the appended claims. For instance, the buoyant structure could be of other suitable shapes, and the body members 28 could be modified to locate with other types of mountings on the helicopter fuselage.

We claim as our invention:

1. A method of detecting underwater objects from a helicopter, the method including the following steps:
   a. suspending a buoyant structure on a cable attached to the helicopter,
   b. hovering above a water surface and lowering the buoyant structure on the cable to float on the water,
   c. lowering a sonar body from a stowed position in the buoyant structure to its operating depth in the water,
   d. when a contact is made, releasing the cable from its attachment to the helicopter and dropping the cable into the water,
   e. maintaining operational contact between the sonar body and the free-flying helicopter,
   f. recovering the cable from the water and reconnecting the cable to the attachment in the helicopter,
   g. raising the buoyant structure to the helicopter,
   h. raising the sonar body to its stowed position in the buoyant structure.

2. Underwater detection apparatus comprising in combination, a buoyant structure, a sonar body housed in a generally vertical aperture within the buoyant structure, first and second cable drums located in the buoyant structure and being operable by a motor and clutch means located in the structure, a cable wound on the first cable drum and routed upwardly for releasable attachment to a helicopter so that rotation of the first drum is effective to raise and lower the buoyant structure relative the helicopter, the cable being constructed and arranged to carry electrical power and control signals when attached to the helicopter, a cable wound on the second cable drum and routed downwardly to support the sonar body so that rotation of the second cable drum is effective to raise and lower the sonar body relative the buoyant structure, the cable being constructed and arranged to carry electrical power to operate the sonar body, an electrical power supply carried by the buoyant structure for operating the sonar body and a transmitting means when the cable from the first drum is detached from the helicopter, and flotation means on the cable from the first drum and located adjacent the end arranged for releasable attachment to the helicopter.

3. Apparatus as claimed in claim 2, wherein sea anchor means are provided adjacent the end of the first cable adapted for attachment to the helicopter.

4. Apparatus as claimed in claim 2, wherein suitably shaped members are provided on the buoyant structure to locate the structure in its stowed position in mountings provided on the helicopter.

5. Apparatus as claimed in claim 2 further comprising cover means located above the aperture for carrying a double pulley around which the cables from the first and second cable drums are routed.

6. Apparatus as claimed in claim 5 further comprising cable angle sensing forks located around the cable supporting the sonar body.

7. Apparatus as claimed in claim 2 further comprising a telescopic sleeve located in the generally vertical aperture to surround the sonar body when in a fully raised position, and means for selectively lowering and raising the telescopic sleeve relative the structure.

* * * * *